United States Patent
Coccia

[11] 3,734,571
[45] May 22, 1973

[54] ELECTRO-PNEUMATIC BRAKE SYSTEM

[75] Inventor: Rudolph A. Coccia, North Versailles, Pa.

[73] Assignee: Westinghouse Air Brake Company, Wilmerding, Pa.

[22] Filed: Jan. 25, 1972

[21] Appl. No.: 220,576

[52] U.S. Cl. ..................................303/20, 303/3
[51] Int. Cl. ..................................B60t 13/68
[58] Field of Search..................303/3, 20, 29, 40

[56] References Cited
UNITED STATES PATENTS

| | | | |
|---|---|---|---|
| 3,443,842 | 5/1969 | Pier | 303/20 |
| 3,490,814 | 1/1970 | Smith et al. | 303/20 |
| 3,547,499 | 12/1970 | Maskery | 303/20 X |

Primary Examiner—Duane A. Reger
Assistant Examiner—Stephen G. Kunin
Attorney—Ralph W. McIntire, Jr. et al.

[57] ABSTRACT

Digital application and release brake control signals generated by an electronic operating unit in accordance with the difference between a desired retardation signal and the available dynamic brake effort are provided to control a pair of thyristors in an a.c. control circuit for energizing one or the other of separate field windings of a torque motor, the output shaft of which drives a pneumatic relay valve device between application, lap and release positions, accordingly. The output of the relay valve provides friction brake effort sufficient to compensate for the inability of the dynamic brake to satisfy the desired level of ratardation called for. A pneumatic means of controlling the relay valve device independent of the torque motor is available to assure friction braking in the event the torque motor drive fails.

8 Claims, 3 Drawing Figures

PATENTED MAY 22 1973   3,734,571

ELECTRO-PNEUMATIC BRAKE SYSTEM

BACKGROUND OF THE INVENTION

Rapid transit vehicles have historically utilized the regenerative capability of their traction motors to provide dynamic braking on the vehicle. The air brake is held in reserve as an emergency brake and to provide friction braking as a supplement to the dynamic braking as the characteristic fading of the dynamic brake occurs. Rather sophisticated electronic brake control systems are presently employed in which the effective dynamic brake is monitored and compared with a desired brake command signal to assure precise and substantially instantaneous blending of the air operated friction brake with the effective dynamic brake to assure smooth deceleration at a rate corresponding to the brake command, irrespective of the degree of dynamic brake effective. One such exemplary electronic brake control system is shown and described in U.S. Pat. No. 3,490,814 assigned to the assignee of the present invention. In this prior art patent, it will be recognized that a pair of on/off type electro-pneumatic valve devices responsive to digital application and release friction brake control signals produced by an electronic operating unit are employed in a cooperative manner to vary control pressure for driving a pneumatic relay valve device having the necessary capacity to supply and exhaust the brake cylinder air pressure.

It is an object of the present invention to obtain a simplified and therefore less costly electronic brake control system of the above-mentioned type by providing a pneumatic relay valve device which is driven directly from a torque motor subject to the friction brake control output of the electronic operating unit to thereby effect control of the friction brake units.

It is another object of the invention to provide a control circuit capable of driving the torque motor in opposite directions from a null zone in accordance with the digital application and release control output signals from the electronic operating unit.

It is still a further object of the invention to arrange the pneumatic relay valve device for operation in response to pneumatic control independent of electronic control thereof.

In accordance with the above objects, a brake control system is provided comprising an electronic operating unit, a torque motor driven pneumatic relay valve device and an electric torque motor control circuit for operating the torque motor. The torque motor is arranged with a pair of field windings which are effective when energized to produce opposing torque forces on the motor output shaft. These respective field windings are each connected in series with a separate secondary winding of an isolation transformer the primary winding of which is connected to a source of a.c. energy.

A pair of silicon controlled rectifiers or thyristors, each gated by a respective one of the digital application and release output signals of the electronic operating unit are included in the motor control circuit to control energization of the field windings by way of a diode bridge rectifier associated with each thyristor to establish thereat a full wave d.c. signal the amplitude of which periodically drops with transition of the a.c. signal polarity to a level insufficient to maintain the thyristors in a forward biased direction, in order to provide a way of terminating conduction of the thyristor following loss of its gate signal.

In one embodiment of the invention, the relay valve device is connected to the torque motor through a pinion gear on the output shaft of the torque motor and a gear rack associated with the valve assembly of the relay valve for actuation to either a supply or exhaust position depending upon which one of the field windings are energized. When the field windings are deenergized, control springs are effective to bias the valve assembly in a lap position intermediate the application and release positions.

In a second embodiment, the relay valve is driven through the motor shaft pinion gear, a spring seat member engageable with the pinion and control springs connecting the spring seat member with the valve assembly. This latter drive arrangement permits actuation of the valve assembly in accordance with a pressure differential created across a piston abutment integral with the valve assembly to provide for penumatic control of the relay valve separate from the torque motor control.

Other objects and attendant advantages of the invention will become evident in view of the following more detailed explanation when considered with the drawing in which.

Figure 1:
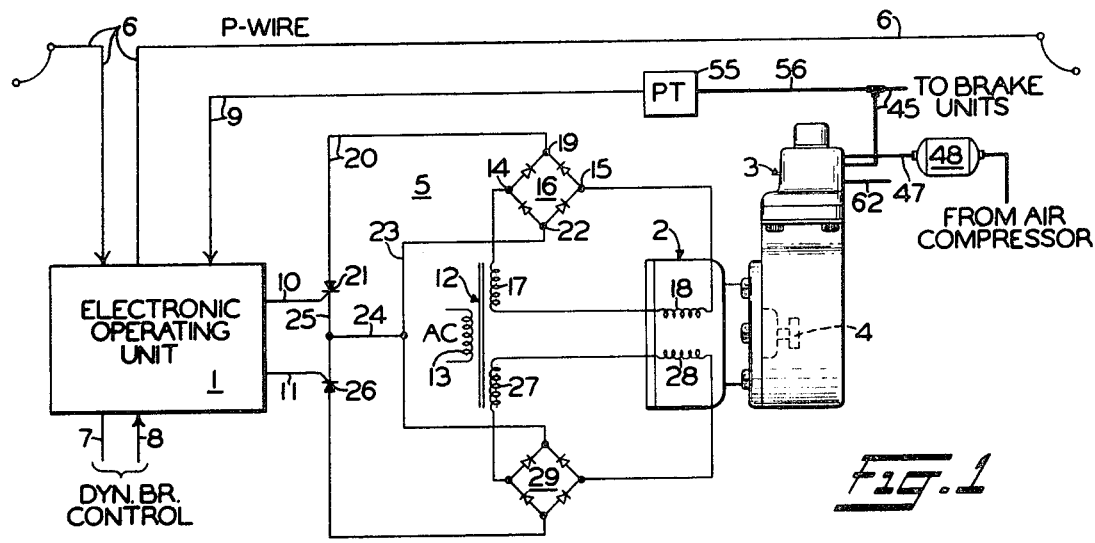
FIG. 1 is a schematic of the brake control system comprising the invention.

Referring now to FIG. 1, the brake control system of the invention comprises generally an electronic operating unit indicated by block 1; a torque motor 2; a penumatic relay valve device 3 driven by the torque motor through a pinion gear 4 attached to the motor output shaft; and a torque motor control circuit 5 interconnecting the electronic operating unit 1 with the torque motor 2. The above-mentioned brake system is arranged on a single transit car with such other well known air brake related equipment, as an air compressor and its associated devices, it being recognized of course that similarly equipped cars may be interconnected in the conventional manner to form a train of cars.

Shown connected in series with electronic operating unit 1 is a control wire 6, which preferably carries through each car of the train an analog current control signal produced by an appropriate controller device (not shown). The electronic operating unit 1 may be similar to the type described in U. S. Pat. No. 3,490,814, issued Jan. 20, 1970, and commonly assigned herewith to Westinghouse Air Brake Company, entitled "Electrically Controlled Fluid Braking System for Rapid Transit Cars." Since a detailed explanation of the electronic operating unit 1 is covered in the above mentioned patent, only the following brief description is deemed necessary for a complete understanding of the present invention.

Control wire 6, commonly referred to as "P-wire," is connected to the control winding of a magnetic amplifier which senses the level of control current flow therein. Associated with the magnetic amplifier is an AC source of electrical energy and a bridge network, which rectifies the magnetic amplifier output to produce a control signal. A brake transfer relay is selected to sense the control signal and close a contact connecting the control signal to charge a control capacitor via a jerk limiting resistor as long as the control signal varies within a preselected range corresponding to the braking mode of vehicle operation (approximately 0–0.5 amps). Above 0.5 amps, the brake transfer relay is effective to connect the control capacitor to ground potential to establish a full brake release condition, as this range of the control signal corresponds to propulsion mode of vehicle operation.

The voltage level to which the control capacitor is charged provides a brake demand signal which is modified in accordance with the vehicle load and thence connected via wire 7 to the vehicle dynamic brake controls to establish a desired level of dynamic braking. A feedback signal representing the degree of dynamic brake actually obtained is connected by a wire 8 to the electronic operating unit where it is compared with the load modified brake demand signal. If the compared signals fail to correspond, indicating a deficiency of dynamic brake, an error signal is derived to establish a friction brake demand signal which is thence compared with a further feedback signal at a wire 9 representing the actual level of friction brake in effect. The error difference between these latter signals provides an analog friction brake control signal, which varies between preselected limits of positive and negative polarity.

The analog friction brake control signal is finally sensed by analog to digital switching circuitry which produces digital output signals at application and release wires 10 and 11 of the electronic operating unit 1 depending upon whether the friction brake control signal is positive or negative. Within a predetermined deadband range approximating zero potential, application and release wires 10 and 11 are each deenergized. At positive potential above the deadband, application wire 10 is energized and release wire 11 is deenergized, while the opposite state of energization of wires 10 and 11 occur at negative potentials below the deadband level.

The torque motor control circuit 5 includes a transformer 12 having a primary winding 13 to which is connected a source of alternating current of predetermined frequency suitable for operation of torque motor 2. Opposing terminals 14 and 15 of a full wave bridge rectifier 16 are connected in series with a secondary winding 17 of transformer 12 and a field winding 18 of torque motor 2. When energized, field winding 18 causes rotation of the torque motor output shaft and pinion gear 14 in a predetermined direction. A terminal 19 of bridge 16 is connected by a wire 20 to the anode terminal of a thyristor 21, which is a three-terminal semiconductor device also known as a silicon controlled rectifier (SCR). Terminal 22 of bridge 16 is connected by a wire 23 and wire 24 to a wire 25 interconnecting the cathode terminals of thyristor 21 and a second thyristor 26. Being similar in configuration to thyristor 21, thyristor 26 is arranged in control circuit 5 with a secondary winding 27 of transformer 12, a field winding 28 of torque motor 2 and a bridge rectifier 29 similar to the described relationship of thryistor 21 with transformer secondary winding 17, field winding 18 and bridge 16. When energized, field winding 28 causes rotation of the torque motor output shaft and pinion gear 4 in a direction opposite that produced by field winding 18.

Thyristors 21 and 26 are conventional, well-known solid state devices of the semiconductor category having a control terminal to which application and release control wires 10 and 11 are connected, respectively. These thyristors have the ability to conduct in a forward biased direction in response to a gating signal which is required to trigger conduction. Once triggered, conduction will continue until the voltage potential across the thyristor establishes a reverse biased condition.

Figure 2:
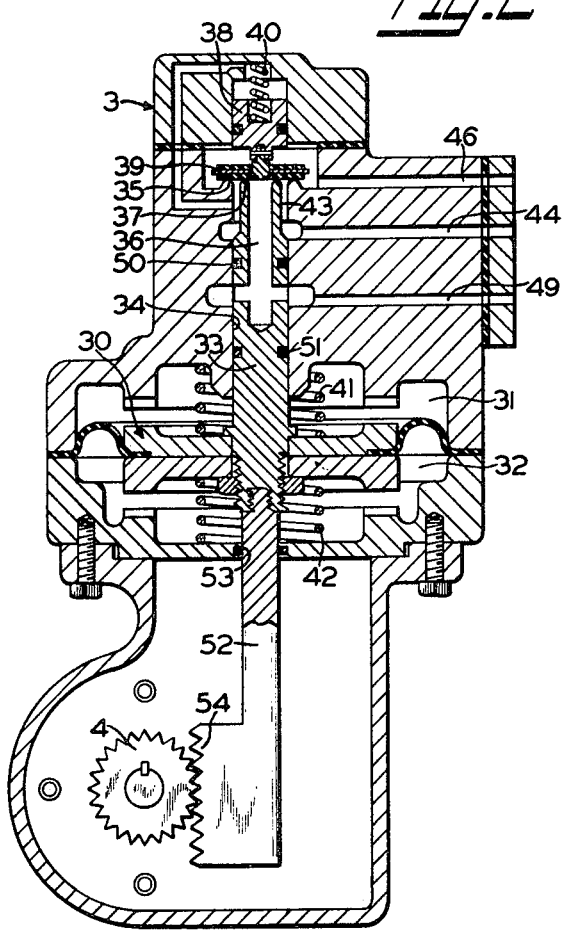
FIG. 2 is a sectional view of one embodiment of the relay valve device represented in FIG. 1.

In FIG. 2 is shown one configuration of pneumatic relay valve device 3, including a valve assembly in which a movable piston abutment 30 thereof coacts with the casing to form a pair of opposing chambers 31 and 32. A valve stem 33 extends from piston abutment 30 and operates in a bore 34 which is formed at one end with an annular valve seat 35. A centrally disposed passage 36 is formed within stem 33 in a manner to form an annular valve seat 37 at the end of the valve stem concentric with valve seat 35. Guidably supported in coaxial alignment with valve seats 35 and 37 by a member 38 is a poppet or disc type valve element 39 which is loaded by a spring 40 to exert a biasing force on the valve element in the direction of valve seats 35 and 37. A spring 41 in chamber 31 and a spring 42 in chamber 32 act opposingly on piston abutment 30 so as to normally support the piston assembly in an intermediate or lap position in which valve element 39 is maintained in sealing engagement with valve seats 35 and 37. An annular cavity 43 formed between bore 34 and the end of stem 33 in maintained in constant communciation with a passage 44 connected by way of a pipe 45 (FIG. 1) to the vehicle brake units. Valve element 39 cooperates with valve seat 35 to control fluid pressure communication between passage 44 and a passage 46 connected by a pipe 47 to a reservoir 48 (FIG. 1) in which is maintained a source of fluid pressure, such as by a governor controlled compressor (not shown). Similarly, valve element 39 cooperates with valve seat 37 to control fluid pressure communication between passage 44 and central passage 36 which is communicated with atmosphere via passage 49. O-rings 50 and 51 are strategically disposed along stem 33 to prevent fluid pressure leakage along bore 34 between passages 44 and 46 and chamber 31.

An actuating stem 52 is inserted through a guide opening 53 in the valve casing and is suitably connected to the piston abutment 30. Formed on actuating stem 52 is a gear rack 54, the teeth of which are engaged with corresponding teeth of pinion gear 4 on the output shaft of torque motor 2, which is suitably secured to the relay valve device 3.

A pressure transducer 55 is connected by a pipe 56 to pipe 45 and provides an electrical feedback signal to electronic operating unit 1 via wire 9 representing the effective friction brake effort developed.

In operation, let it be assumed that the torque motor field windings 18 and 28 are each deenergized in accordance with deenergization of application and release control wires 10 and 11 so that the torque motor produces no rotation of pinion gear 4 in either direction. Consequently, no actuating force is applied to the valve assembly of relay valve device 3 so that piston abutment 30 is supported by springs 41 and 42 in an intermediate position, as shown. Fluid pressure communication between passage 44 and either passage 46 or 49 is interrupted in this intermediate position of the piston abutment to produce a lap condition of the friction brake.

In response to application control wire 10 becoming energized due, for example, to electronic operating unit 1 sensing the inability of the dynamic brake to produce the degree of retardation called for, thyristor 21 is provided with a gate signal at its control terminal. This gate signal represents a call for friction brake and remains present until the friction brake effort subsequently produced supplements the dynamic brake to a degree necessary to obtain the retardation called for. When gated, thyristor 21 is effective to complete a circuit in which the secondary winding 17 of transformer 12 energizes the torque motor field winding 18. Bridge rectifier 16 is effective to conduct current flow during one half cycle of the a.c. signal from the cathode of thyristor 21 to its anode by way of wires 25, 24, 23 to terminal 22 of bridge 16 and thence via terminal 14 to transformer winding 17, field winding 18, bridge terminals 15 and 19 to wire 20. During the opposite half cycle of the a.c. signal, current flows from the cathode of thyristor 21 to its anode by way of wires 25, 24, 23 to terminal 22 of bridge 16 and thence via terminal 15 to field winding 18, trnasformer winding 17, bridge terminals 14 and 19 to wire 20. It will be appreciated from the above that bridge rectifier 16 produces full wave rectification of the a.c. signal source for current flow via thyristor 21 in the forward conducting direction, while maintaining alternating current flow at field winding 18. It will also be appreciated that the continued presence of the gating signal at application wire 10 assures continued conduction of thyristor 21 and thus current flow of the a.c. signal source via field winding 18, even though the amplitude of the full wave recitfied signal from bridge terminal 19 periodically drops to a level insufficient to maintain thyristor 21 in a forward biased condition. The point at which the forward biased characteristic of the thyristor is momentarily lost corresponds to the polarity transition of the a.c. signal.

In accordance with energization of field winding 18, pinion gear 4 on the output shaft of torque motor 2 is rotated in a counterclockwise direction, as viewed in FIG. 2. Pinion gear 4 in turn acts through gear rack 54 and actuating stem 52 to force piston abutment 30 to its upper-most position in opposition to the resistance offered by spring 41, as it is placed in compression. In this application position, seat 37 on stem 33 lifts valve element 39 off seat 35 to communicate fluid supply pressure from reservoir 48 to the vehicle brake units via pipe 47, passage 46, the open supply valve seat 35, annular cavity 43, passage 44 and pipe 45.

As friction brake effort accordingly develops, the fluid brake pressure is sensed by transducer 55 and relayed via wire 9 to the electronic operating unit. When the friction brake effort has developed to the desired magnitude, electronic operating unit 1 operates to deenergize application wire 10, thereby removing the gating signal from the control terminal of thyristor 21 which subsequently becomes non-conductive when the rectified current flow via bridge terminal 19 becomes essentially zero as the polarity of the a.c. current source is reversed. In the non-conducting state, thyristor 21 effectively interrupts current flow to the motor field winding 18, permitting spring 41 to drive piston abutment 30 of relay valve device 3 back to its lap position in which valve element 39 is forced by spring 40 into engagement with valve seat 35. This terminates the supply of fluid pressure to the brake units at a value corresponding to the desired degree of friction brake effort called for by the electronic operating unit 1.

Similarly, energization of release control wire 11 in accordance with a desired reduction of friction brake effort results in thyristor 26 being gated to a conducting state wherein field winding 28 of torque motor 2 is energized in exactly the same manner as previously explained relative to energization of field winding 18 in accordance with application control wire 10 being energized. Consequently, pinion gear 4 is rotated in a clockwise direction to force piston abutment 30 in opposition to spring 42 to its downward-most position in which valve seat 37 is pulled away from valve element 39, which remains seated on valve seat 35. In this release position, fluid pressure effective at the vehicle brake units is vented to atmosphere via pipe 45, passage 44, annular cavity 43, past valve seat 37, central passage 36 and passage 49.

The release of fluid brake pressure is sensed by pressure transducer 55 and relayed via wire 9 to electronic operating unit 1, which deenergizes release control wire 11 when the desired reduction of friction brake effort is obtained. In accordance with wire 11 becoming deenergized, thyristor 26 becomes non-conducting and the torque motor field winding is accordingly deenergized to permit spring 42 to return piston abutment 30 to its intermediate position. The venting of fluid brake pressure is thus terminated by the seating of valve element 39 on seat 37 and the friction brake effort is thus reduced in accordance with the degree of reduction necessary to satisfy the desired level of retardation called for.

Figure 3:
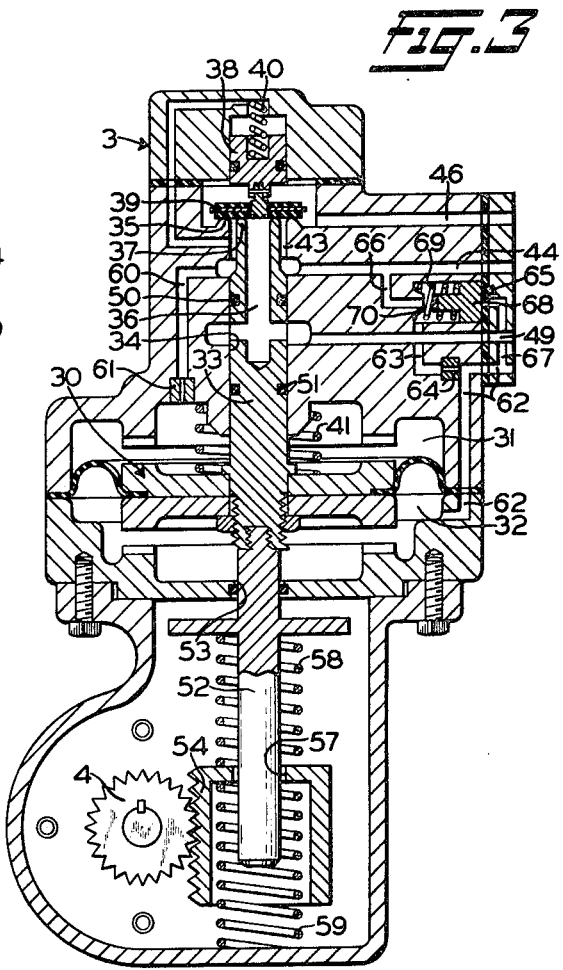
FIG. 3 is a sectional view of an alternate embodiment of the relay valve device of FIG. 1.

In an alternate arrangement of the invention, relay valve device 3 is modified according to the configuration shown in FIG. 3, in order to incorporate a pneumatic brake control feature for purposes of providing an auxiliary brake control for use in the event of a malfunction or otherwise inoperative condition of the electronic operating unit 1, the torque motor 2 or the torque motor control circuit 5. Although not a part of the present invention, it is to be understood that transition to pneumatic auxiliary control of the friction brake may be accomplished either manually or automatically, as desired.

The relay valve configuration of FIG. 3 is modified from that of FIG. 2 in that actuating stem 52 is made separate from gear rack 54 which is formed with an opening 57 in which stem 52 is able to move relative to gear rack 54. Also, a spring 58 comparable to spring 42 in FIG. 3 is disposed between a flange surrounding actuating stem 52 and gear rack 54. An additional spring 59 acts between the relay valve casing and gear rack 54. Springs 41, 58 and 59 are necessarily assembled in a predetermined state of compression with the piston assembly thereby supported in its previously explained intermediate or lap position.

It will be further noted that a passage 60 communicates passage 44 with chamber 31 by way of a choke 61 and that a passage and pipe 62 is communicated with chamber 32. A branch passage 63 in which is disposed a choke 64 connects passage 62 via a normally open check valve device 65 to a branch passage 66 of passage 44. Another branch passage 67 of passage 62 is connected to the face of a piston valve 68 comprising check valve device 65. A spring 69 is provided to urge piston valve 68 off its seat 70.

During normal operation of torque motor 2, gear 4 is rotated in either a counterclockwise or a clockwise direction, as viewed in FIG. 3, depending upon energization of field winding 18 or 28, which in turn depends upon the electronic operating unit 1 signalling for a friction brake application or release, respectively, as explained with regard to FIG. 2. In accordance with rotation of gear 4 in a counterclockwise direction, gear rack 54 is driven upward, in turn causing spring 58 to deflect actuating stem 52 and consequently piston abutment 30 to the upper-most position of the valve assembly to provide a supply of fluid brake pressure to the vehicle brake units via passage 44, as previously explained. At the same time, fluid pressure is connected to chamber 31 via passage 60 and choke 61 and to chamber 32 via branch passage 65, past the unseated piston valve 67 of check valve 64, branch passage 63, choke 64 and passage 62. This establishes fluid pressure equalization between passages 31 and 32, thus assuring that no pressure differential develops across piston abutment 30, which is consequently affected only by the torque motor drive. When electronic operating unit 1 senses that sufficient friction brake effort has been obtained, the torque motor is deenergized and the valve assembly is returned to lap position by spring 41.

Clockwise rotation of gear 4 in response to energization of the torque motor results in gear rack 54 being driven downward, compressing spring 59. Consequently, spring 58 is relaxed an amount proportionate to compression of spring 59, thereby allowing spring 41 to deflect piston abutment 30 in a downward direction in which position release of fluid brake pressure from the vehicle brake units is realized. When the desired friction brake effort reduction is accomplished, as monitored by electronic operating unit 1, torque motor 2 is deenergized and spring 59 is permitted to return gear rack 54 to its normal position. Spring 58 thus effects upward movement of actuating stem 52 to restore piston abutment 30 to lap position and thereby terminate any further reduction of fluid brake pressure. It is apparent, of course, that fluid pressure effective in chambers 31 and 32 is vented via chokes 61 and 64 during brake release at corresponding rates so as to maintain pressure equalization between chambers 31 and 32.

It will thus be appreciated from the foregoing that the valve assembly is normally disposed in lap position and is operative in response to torque motor operation to effect application or release control of fluid brake pressure in a manner similar to that of FIG. 2, irrespective of the presence of fluid pressure in chambers 31 and 32, the purpose of which is hereinafter explained.

Relay valve device 3 may be operated pneumatically by the application of fluid control pressure to chamber 32 via passage 62 to obtain brake pressure which may be developed in graduated amounts to realize proportional control of the friction brake. Pressurization of chamber 32 results in piston abutment 30 being moved to its upper-most position, during which movement actuating stem 52 is moved therewith independently of gear rack 54. At the time of pressurization of chamber 32, fluid pressure in passage 62 is connected via branch passage 67 to the face of piston valve 68 which is shifted in opposition to spring 69 into engagement of seat 70. In its seated condition, check valve 65 prevents equalization of fluid pressure effective in chambers 31 and 32, thereby setting up the valve assembly of relay valve device 3 for operation in a self-lapping fashion. That is to say that application fluid pressure connected to the vehicle brake units via passage 44 is also connected to chamber 31 at a controlled rate via passage 60 and choke 61. When the force on the piston abutment 30, due to pressure in chamber 31, in addition to springs 40 and 41, overcomes the opposing control force of fluid pressure in chamber 32 acting on the piston abutment, the valve assembly will be returned to its intermediate position, in which further supply of fluid pressure to the vehicle brake units is terminated at a value corresponding to the control pressure in chamber 32 and a lap condition prevails.

Brake pressure may also be released in controlled increments by effecting a reduction of fluid pressure in chamber 32 to cause a pressure differential across piston abutment 30 and a resultant force imbalance. Fluid pressure effective on the face of piston valve 68 will follow the reduction of control fluid pressure from chamber 32 via passage 62 at a rate faster than the rate at which fluid pressure effective on the opposite side of piston valve 68 can be reduced via branch passage 63 and passage 62 due to the effect of choke 64 therebetween. This will allow the check valve to be unseated by the resultant pressure differential and spring 69. However, due to the effect of series chokes 61 and 64, fluid pressure in balancing chamber 31 will be prevented from following the reduction of fluid pressure from control chamber 32. The resultant force imbalance due to a reduction of fluid pressure from control chamber 32 moves piston abutment 30 to its downward-most position in which springs 58 and 59 are further compressed and brake pressure is vented to atmosphere via passage 49, as previously explained.

Concurrent with the venting of brake pressure, fluid pressure effective in chamber 31 is also vented at a controlled rate via choke 61 and passage 60 which is communicated with the central passage 36 in stem 37 and exhaust passage 49 until a force balance is restored across piston abutment 30 sufficient to return the valve assembly to a lap condition. Thus, brake pressure is reduced a desired amount corresponding to the reduction of control pressure from chamber 32 and check valve 65 is reset to an open position in which it remains during subsequent increments of brake release and from which position it will be actuated to interrupt fluid pressure communication between chambers 31 and 32 in response to an increase of fluid control pressure supplied to chamber 32.

From the above, it will be apparent that graduated increments of brake applications and releases may be obtained by variation of pneumatic control pressure at chamber 32 as a means of assuring friction brake control in the event the torque motor control of the friction brake fails to materialize for any reason. It will be further appreciated by one skilled in the art that either a manual or automatic transition to the pneumatic mode of brake control may be accomplished and further that such transition may be made without any substantial change in the effective level of retardation resulting, so that passenger comfort is not sacrificed.

Having now described the invention, what I claim as new and desire to secure by Letters Patent, is:

1. A brake control system for a railway vehicle having brake units for producing friction brake effort on said vehicle and an electronic brake control unit to which a brake command signal is applied, said command signal being compared with a feedback signal representative of the degree of dynamic brake effort effective on said vehicle to provide an error signal, in accordance with which error signal friction brake application and release control signals are derived, wherein the improvement comprises the combination of:
- a. relay valve means operable from a lap position to an application position in which fluid pressure communication is established between a source of fluid pressure and said brake units and to a release position in which fluid pressure communication is established between said brake units and atmosphere,
- b. a torque motor for driving said relay valve means, said torque motor including a pair of opposing field windings energization of a respective one of which effects operation of said motor to drive said relay valve means to said application or said release position, and
- c. a torque motor control circuit including:
  - i. a source of electrical energy,
  - ii. said pair of torque motor field windings, and
  - iii. switch means operative responsive to said application and release control signals for controlling current flow between said source of electrical energy and one or the other of said field windings.

2. A brake control system, as recited in claim 1, wherein said source of electrical energy comprises transformer means for coupling an a.c. input signal from a primary winding to a pair of secondary windings thereof, each of said secondary windings being connected in series with a separate one of said pair of field windings.

3. A brake control system, as recited in claim 2, wherein said torque motor control circuit further comprises:
- a. said switch means comprising first and second thyristors each having a respective one of said application and release control signals connected to a gate input thereof to control conduction of said thyristors, and
- b. rectifier means associated with each of said secondary windings for supplying to said thyristors a d.c. signal the amplitude of which periodically establishes a reverse biased condition thereat in accordance with the polarity transition of said a.c. signal to provide for terminating current flow to one or the other of said field windings via the conducting one of said thyristors following loss of said application or release control signal at the gate input of the conducting thyristor.

4. A brake control system, as recited in claim 1, further including means for providing a feedback signal to said electronic control unit representative of friction brake effort on said vehicle for modifying said error signal accordingly.

5. A brake control system, as recited in claim 1, wherein said relay valve means comprises:
- a. an actuating valve assembly having means for connecting the output shaft of said torque motor to said valve assembly to effect actuation thereof in opposite directions from said lap positions to said application and release positions in accordance with energization of one or the other of said pair of field windings,
- b. spring means for constraining said valve assembly in said lap position in the absence of an actuating force thereon, and
- c. a poppet valve element arranged in cooperative relationship with a first annular valve seat formed at the end of a stem of said actuating valve assembly to control fluid pressure communication between said brake units and atmosphere and a second annular valve seat formed concentric with said first valve seat by the bore in which said stem operates to thereby control fluid pressure communication between said brake units and said source of fluid pressure.

6. A brake control system, as recited in claim 5, further comprising:
- a. said actuating valve assembly including a differential piston abutment having formed on opposite sides thereof a control chamber subject to a fluid pressure control signal and a balancing chamber subject to fluid pressure effective at said brake units, said actuating valve assembly being operable between said application and release positions in accordance with the pressure differential across said piston abutment; and
- b. means for normally establishing fluid pressure equalization between said control chamber and said balancing chamber to prevent actuation of said valve assembly by said differential piston abutment and for interrupting fluid pressure equalization between said control chamber and said balancing chamber in response to application of said fluid pressure control signal to provide actuation of said valve assembly by said differential piston abutment.

7. A brake control system, as recited in claim 6, wherein said means for connecting the output shaft of said torque motor to said valve assembly includes said spring means.

8. A brake control system, as recited in claim 6, wherein said means for connecting the output shaft of said torque motor to said valve assembly comprises:
- a. a spring seat member engageable with the torque motor output shaft for axial displacement in accordance with opposite directions of rotation of said output shaft, and
- b. said spring means including:
  - i. a first spring acting on said piston abutment to urge said valve assembly to said release position,
  - ii. a second spring disposed between said piston abutment and said spring seat member to urge said valve assembly to said application position in opposition to said first spring, and
  - iii. a third spring acting on said spring seat member in opposition to said second spring to maintain said first and said second springs in a state of compression in the absence of an actuating force on said piston assembly.

* * * * *